United States Patent
Casaletto et al.

(10) Patent No.: US 10,749,698 B2
(45) Date of Patent: Aug. 18, 2020

(54) FEATURE-AWARE SOFTWARE USAGE METERING

(71) Applicant: VMware, Inc., Palo Alto, CA (US)

(72) Inventors: Holly Casaletto, Sunnyvale, CA (US); Christopher Gilliard, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 275 days.

(21) Appl. No.: 15/599,161

(22) Filed: May 18, 2017

(65) Prior Publication Data

US 2018/0337794 A1  Nov. 22, 2018

(51) Int. Cl.
| | | |
|---|---|---|
| H04L 12/14 | (2006.01) | |
| H04L 29/08 | (2006.01) | |
| H04L 12/26 | (2006.01) | |
| G06F 9/54 | (2006.01) | |
| H04M 15/00 | (2006.01) | |

(52) U.S. Cl.
CPC .......... *H04L 12/1439* (2013.01); *G06F 9/542* (2013.01); *H04L 43/065* (2013.01); *H04L 43/0876* (2013.01); *H04L 43/10* (2013.01); *H04L 67/025* (2013.01); *H04L 67/1097* (2013.01); *H04L 67/22* (2013.01); *H04M 15/00* (2013.01); *H04M 15/58* (2013.01); *H04M 15/60* (2013.01); *H04M 15/61* (2013.01)

(58) Field of Classification Search
CPC ... H04L 43/065; H04L 43/0876; H04L 43/10; H04L 67/025; H04L 67/1097; H04L 67/22; H04L 12/1439; H04M 15/58; H04M 15/00; H04M 15/61; H04M 15/60; G06F 9/542; G06F 11/301; G06F 11/3055; G06F 11/3006
See application file for complete search history.

(56) References Cited

U.S. PATENT DOCUMENTS

| | | | | |
|---|---|---|---|---|
| 8,983,987 | B2 * | 3/2015 | Ravi | G06Q 30/04 707/758 |
| 8,997,242 | B2 * | 3/2015 | Chen | G06F 21/105 726/26 |
| 9,043,458 | B2 * | 5/2015 | Balaji | H04L 43/04 709/217 |
| 9,137,313 | B2 * | 9/2015 | Yoon | H04L 61/15 |
| 9,202,225 | B2 * | 12/2015 | Ferris | G06F 11/34 |

(Continued)

*Primary Examiner* — Patrice L Winder
(74) *Attorney, Agent, or Firm* — Patterson + Sheridan, LLP

(57) ABSTRACT

An approach is disclosed for metering usage of cloud computing services at a feature level. In one embodiment, a metering application receives feature status information indicating which features of a cloud computing service are enabled through an event-driven process, in which events are generated and reported to the metering application when features are enabled or disabled, as well as a polling process, in which the metering application periodically queries the statuses of features. Feature status information gathered by the metering application is persisted in a database as collective feature statuses, with each collective feature status being associated with an interval of time during which feature statuses are unchanged. The feature status information obtained and persisted in the database may then be used to, for example, determine licensing fees based on feature usage or report feature usage to facilitate quantitative studies of the usefulness of features.

20 Claims, 5 Drawing Sheets

(56) References Cited

U.S. PATENT DOCUMENTS

| | | | | |
|---|---|---|---|---|
| 9,354,939 B2* | 5/2016 | Ferris | ............... | G06F 9/5072 |
| 9,881,144 B2* | 1/2018 | Lincoln | ............... | G06F 8/60 |
| 9,886,254 B2* | 2/2018 | Vedula | ............... | G06F 8/60 |
| 10,026,069 B2* | 7/2018 | Van Cutsem | ............... | G06F 11/3034 |
| 10,296,361 B2* | 5/2019 | Ouyang | ............... | G06Q 10/0631 |
| 10,373,218 B1* | 8/2019 | Jenkins | ............... | G06Q 30/06 |
| 2011/0313896 A1* | 12/2011 | Nuggehalli | ............... | G06K 9/00993 |
| | | | | 705/30 |
| 2012/0246740 A1* | 9/2012 | Brooker | ............... | H04L 63/20 |
| | | | | 726/28 |
| 2013/0013767 A1* | 1/2013 | Stober | ............... | G06F 9/44505 |
| | | | | 709/224 |
| 2013/0245742 A1* | 9/2013 | Norris | ............... | A61F 2/95 |
| | | | | 623/1.11 |
| 2013/0262250 A1* | 10/2013 | Lingafelt | ............... | G06Q 30/06 |
| | | | | 705/26.1 |
| 2015/0172400 A1* | 6/2015 | Sarfati | ............... | H04L 67/22 |
| | | | | 709/224 |
| 2015/0312422 A1* | 10/2015 | Leemet | ............... | H04L 41/082 |
| | | | | 455/406 |
| 2016/0005016 A1* | 1/2016 | Eliahu | ............... | G06F 21/10 |
| | | | | 705/44 |
| 2017/0255455 A1* | 9/2017 | Collier | ............... | G06F 8/61 |

* cited by examiner

| id | userID | appsID | F1 | F2 | ... | Fn | StartTime | EndTime |
|---|---|---|---|---|---|---|---|---|
| 1 | 101 | 1001 | True | False | ... | False | 2016-10-01 12:00:00 | 2016-10-03 15:17:23 |
| 2 | 101 | 1002 | False | False | ... | False | 2016-10-02 07:00:03 | |
| 3 | 101 | 1001 | True | True | ... | False | 2016-10-03 15:17:23 | 2016-10-07 07:03:11 |
| 4 | 101 | 1001 | True | False | ... | True | 2016-10-07 07:03:11 | |

FIG. 2

FEATURE-AWARE SOFTWARE USAGE METERING

BACKGROUND

Cloud computing may be viewed as the provisioning of scalable computing resources as a service over a network. More formally, cloud computing may be defined as a computing capability that provides an abstraction between the computing resource and its underlying architecture (e.g., servers, storage, networks), enabling convenient, on-demand network access to a shared pool of configurable computing resources that can be rapidly provisioned and released with minimal management effort or service provider interaction.

Cloud computing services are typically licensed under the subscription license model, in which software licenses are leased to rather than owned by users. For example, several types of predefined licenses (e.g., standard, enterprise, etc.) may be provided for a cloud computing service. In such a case, a user is required to pay for all features included in a predefined license, even if the user does not actually use some of those features.

SUMMARY

One embodiment provides a computer-implemented method for dynamically probing user-configurable software having multiple features, each of which can be dynamically enabled or disabled, the method including periodically probing the user-configurable software to determine which features of the software are enabled; while periodically probing, listening for events generated by the software indicating features of the software which are being enabled; and for each of the features, determining one or more durations during which the feature is enabled based on at least results of the probing and the generated events.

Further embodiments provide a non-transitory computer-readable medium that includes instructions that, when executed, enable a computer to implement one or more aspects of the above method, and a computer system programmed to implement one or more aspects of the above method.

BRIEF DESCRIPTION OF THE DRAWINGS

FIG. 2 illustrates a table data structure which stores software feature statuses, according to an embodiment.

DETAILED DESCRIPTION

Embodiments disclosed herein provide techniques for metering usage of cloud computing services at a feature level. As used herein, a "feature" refers to a distinguishing characteristic of software. Embodiments disclosed herein meter features that are functional in nature and optional (i.e., the features can be enabled or disabled). In one embodiment, a metering application receives feature status information indicating which features of a cloud computing service are enabled through both an event-driven process, in which events are generated and reported to the metering application when features enabled or disabled, as well as a polling process, in which the metering application periodically queries the statuses of features as enabled or disabled. In such a case, a management application that is responsible for managing the cloud computing service may include application programming interface(s) (API(s)) that permit events to be triggered by feature status changes, as well as API(s) that can be invoked by the metering application to obtain feature status information. In one embodiment, feature status information is persisted in a database as collective feature statuses, with each collective feature status being associated with an interval of time during which each of the feature statuses in the collective feature status is the same. A new collective feature status entry is generated whenever the metering application determines, through either the event-driven or the polling process, that the enablement status of one or more features has changed. The feature usage information that is obtained and persisted in the database in this manner may later be used to, e.g., determine licensing fees based on feature usage or report feature usage to facilitate quantitative studies of the usefulness of features.

Figure 1:
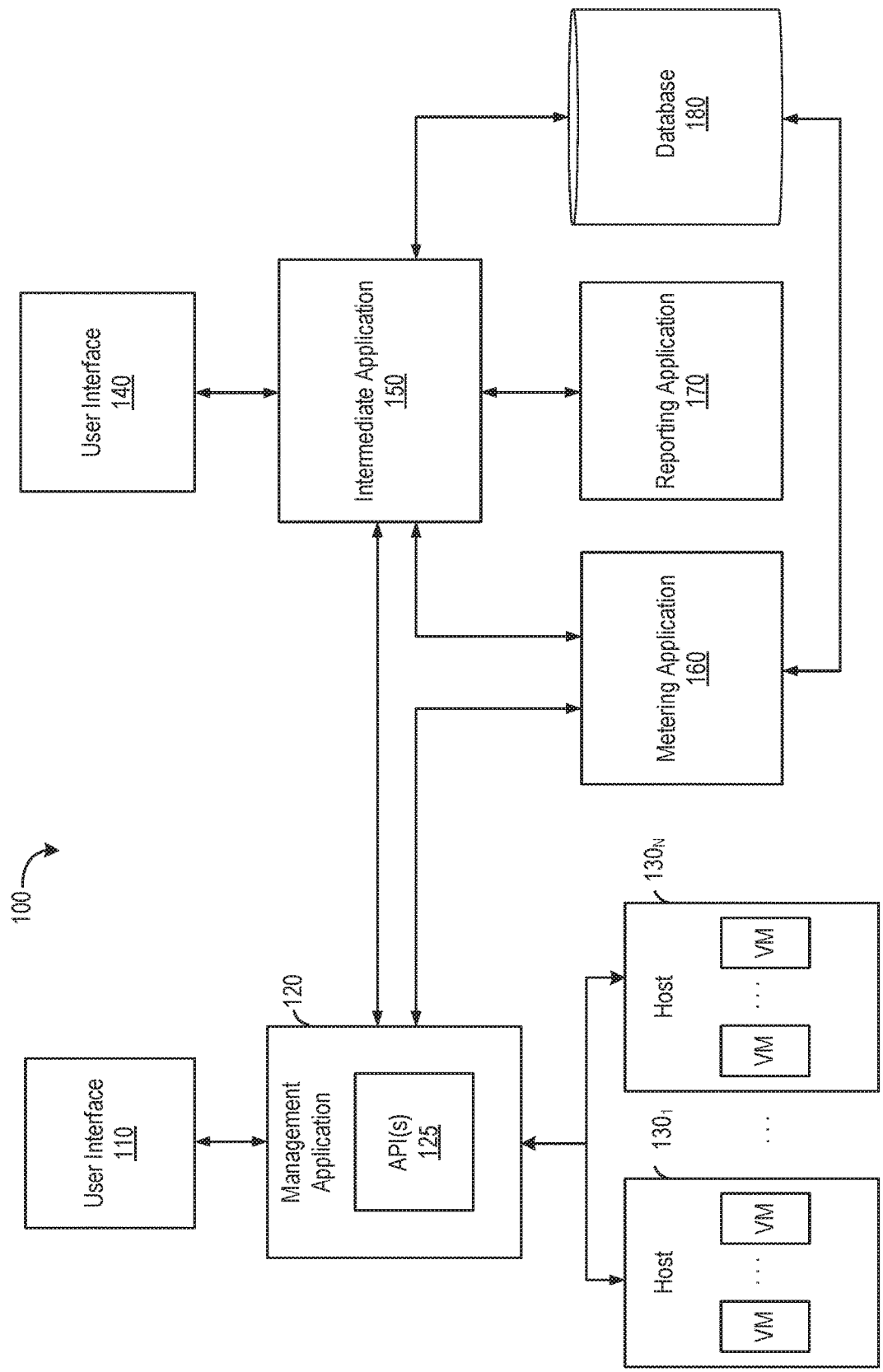
FIG. 1 illustrates a block diagram of a computing system in which one or more embodiments may be implemented.

FIG. 1 illustrates a block diagram of a computing system 100 in which one or more embodiments may be implemented. As shown, computing system 100 includes a user interface 140, an intermediate application 150, a metering application 160, a reporting application 170, a database 180, and a cloud computing service management application 120 (also referred to herein as the "management application"). Management application 120 is responsible for managing one or more services provided by a cloud computing system. As shown, management application 120 is configured to manage a virtual infrastructure which includes host computers $130_{1-N}$ in one or more datacenters, virtual computing instances such as virtual machines (VMs) or containers running within host computers $130_{1-N}$, provisioning and migration of the VMs or containers, and the like. In a particular embodiment, management application 120 may be a VMware vCenter® server that provides centralized management and extensibility for the VMware vSphere® product commercially available from VMware, Inc. of Palo Alto, Calif. Although a particular management application 120 is shown for illustrative purposes, it should be understood that techniques disclosed herein are also applicable to other types of applications, e.g., applications such as VMware NSX® that manage network virtualization and security.

As shown, management application 120 is accessed through a user interface 110 that permits users (e.g., cloud customers) to configure the cloud computing service(s) managed by management application 120. For example, user interface 110 may be a vCenter® management console or an NSX® management console where management application 120 is a VMware vCenter® server or a VMware NSX®, respectively. In one embodiment, user interface 110 permits users to, among other things, enable and disable features of the cloud computing services managed by management application 120. That is, users are able to configure the cloud computing services to use or not use certain features at any time based on the users' needs. User interface 110 may be a web-based interface, such as a webpage, that can be displayed on a web browser through which the user can select features to enable and disable. Returning to the example of management application 120 being an application for managing a virtual infrastructure such as VMware vCenter®, one of the services that management application 120 manages may be a software-defined storage service, such as VMware vSAN®, that pools storage resources from multiple host computers. Features of the software-defined storage service may include, e.g., a stretched cluster feature that permits host computers in geographically distinct datacenters to be part of the same logical cluster, an input/output operations per second (IOPS) limit feature that restricts the maximum number of IOPS allowed per virtual computing instance (e.g., per VM), a deduplication feature that performs block-level deduplication to save storage space, an erasure coding feature which breaks data into pieces that are spreading across multiple devices and adds parity data, among other things. Each of these features is optional in one embodiment and may be enabled or disabled via user interface 110.

Intermediate application 150 is an intermediate service layer between user interface 140 and components of system 100's internal layer, which include metering application 160, reporting application 170, and database 180. Intermediate application 150 is accessed through user interface 140, and configured to process inputs received through user interface 140 and pass the processed inputs to metering application 160. For example, a cloud administrator may input, via user interface 140, a selection of a cloud computing service whose features are to be metered, and intermediate application 150 may pass such a selection to metering application 160. In addition, intermediate application 150 receives usage reports generated by reporting application 170 based on stored feature usage information and to pass such reports to user interface 140 for display to the user.

In one embodiment, intermediate application 150 is a web application and user interface 140 is a web-based interface. In such a case, the web-based user interface 140 may permit users to manage (e.g., add, modify, or remove) cloud computing services whose features are metered, monitor the health of the metering, and request a usage report to be generated by reporting application 170 on demand, among other things, through a web browser. As another example, the user may request through user interface 140 a usage report detailing the usage of features in the software-defined storage service and/or reporting a licensing fee calculated based on the usage of the features.

Metering application 160 is responsible for determining whether features of cloud computing services that are selected for metering are enabled for use or not, as well as tracking the feature statuses through time by persisting the statuses in database 180. In one embodiment, as soon as a feature is detected as being enabled, metering application 160 may consider that feature as being used. As described, selections of cloud computing services to meter are passed to metering application 160 by intermediate application 150. In turn, metering application 160 determines which features of the selected cloud computing services are to be metered by reading a configuration file that a system administrator can edit to add, modify, or remove features to metered for each selected cloud computing service. For example, the configuration file may be read when the metering application is started, and, in such a case, to change the feature set to be metered for a cloud computing service, the configuration file may be updated with the new feature set and the metering application 160 restarted. Metering application 160 may determine which metered features of the selected cloud computing services have been enabled using an event-driven process, a periodic polling process, or a combination of these processes. Illustratively, management application 120 provides API(s) 125, which in one embodiment include API(s) that permit events to be triggered by feature status changes from enabled to disabled, or vice versa. Metering application 160 listens for such events generated in response to feature status changes. In addition, API(s) 125 may include API(s) that metering application 160 can invoke periodically (i.e., poll) to query the statuses of features. For example, management application 120 may provide health-checking API(s), associated with health-checking component(s) used to monitor the statuses of cloud computing service(s) managed by management application 120, and such health-checking API(s) can be invoked to obtain information on whether certain features being metered for the services managed by management application 120 are currently enabled. As another example, in the IOPS limit and erasure coding features discussed above, metering application 160 may determine if these features are being used by checking if any VMs are complying with the storage policy that has those features defined, with the features being considered in use by any user of at least one virtual machine is compliant with the policy that has the features defined in it.

In one embodiment, metering application 160 is configured to receive events generated in response to feature status changes and to also perform periodic polling. Experience has shown that polling tends to be resource intensive and may temporarily freeze management application 120 and the associated user interface 110. In addition, polling occurs periodically, so feature status changes can only be tracked accurately up to a given period of delay (e.g., an hour of delay if polling occurs every hour). On the other hand, events triggered by feature status changes may be less resource intensive and help track feature statuses in (essentially) real time. However, events may be dropped if, for example, packets that include event information are dropped, and metering application 160 would not be notified of the feature status change(s) in such cases. To reduce resource usage while overcoming the problem of events being dropped, a hybrid approach may be employed in which management application's API(s) 125 generate events responsive to feature status changes and metering application 160 also periodically polls for all statuses of features being metered so that, even if events are dropped, the features statuses are determined for at least the polling times. In such a case, polling may be performed relatively infrequently, such as every hour, to minimize resource usage overhead while accurately determining feature usage.

In addition to feature usage information, metering application 160 may also collect resource usage data for the cloud computing services being metered and management data for other cloud computing services. For example, the resource usage data may include data on memory and disk storage consumed by one or more virtual computing instances. Such resource usage data may also be persisted to database 180. In a particular embodiment, the collective statuses of cloud computing service features may be used as a multiplier to resource usage when determining licensing fees, as described in greater detail below.

Having obtained current statuses of features being metered via the feature status change events and/or periodic polling, metering application 160 is further configured to compare the most recent feature statuses, stored in database 180, with the current feature statuses and to update database 180 with the current feature statuses if any feature status differs from the most recent status stored in database 180. In one embodiment, described in greater detail below, metering application 160 tracks feature statuses and updates database 180 according to the following algorithm, in which the closing of a metering interval may include updating an "end time" column of a row in a database 180 table representing the metering interval from null to the current time, and opening a new metering interval may include inserting a new row into the database 180 table with its "start time" column set to the current time:

```
Tracking( )
T ← current collective feature status [T1, T2, T3, ... , Tn]
S ← most recent stored collective feature status [S1, S2, S3, ... , Sn]
if (T != S) {
    Close most recent stored metering interval representing S
    Open a new metering interval representing T
}
```

Database 180 is the persistence store for system 100. Feature status information determined by metering application 160 is passed to database 180 for storage therein. Database 180 may include one or more tables with rows that store collective feature statuses, i.e., the statuses of all features being metered, during respective metering intervals. As described in greater detail below, the status of each feature in a collective feature status may be set to true if the feature is enabled, false if the feature is disabled, and null if the feature is not being metered.

Reporting application 170 is configured to receive user requests from intermediate application 150 for usage reports, generate the requested usage reports based on feature usage information persisted in database 180, and output the usage reports to the user via intermediate application 150 and user interface 140. Any feasible usage reports may be generated. For example, the usage reports may include licensing fee information or statistics on feature usage that can be analyzed to understand the usefulness of the features.

FIG. 2 illustrates a table data structure 200 which stores feature statuses in database 180, according to an embodiment. As described, database 180 is a persistence store for the metering system. In one embodiment, database 180 is a relational database with one or more tables, including table 200, that keep track of feature status changes. As shown, table 200 is structured to include rows (e.g., rows 201-204) that each stores the collective feature status of a particular cloud computing service licensed by a particular user during an interval of time (also referred to herein as a "metering interval"). Table 200 further includes columns for each of the features, as well as "StartTime" and "EndTime" columns to mark the metering interval of the collective feature status stored in the row.

Illustratively, table 200 includes the following columns: "id," "userID," "appsID," "F1," "F2," ... , "Fn," "StartTime," and "EndTime." The id, userID, and appsID columns are used to store integers representing a row's primary key and identifiers (IDs) of the user and cloud computing service associated with the row, respectively. The F1, F2, ... , Fn columns are used to store Boolean values representing whether features 1 through n of the cloud computing service identified by the appsID are enabled or not for the user identified by the userID. Fields representing features which are not being metered may be left as null. Together, the statuses of the features in F1, F2, ... , Fn that are being metered make up a "collective feature status." The StartTime and EndTime fields are used to store timestamps representing the beginning and ending times of the metering interval during which the collective feature status is applicable.

As described, metering application 160 determines the statuses of cloud computing service features being metered through an event-driven process and/or a polling process and persists those statuses in database 180. In one embodiment, metering application 160 compares the most recent feature statuses stored in table 200 with current feature statuses determined through an event-driven and/or polling process. If any current feature status differs from that feature's status in the most recently stored collective feature status in table 200, then metering application 160 (1) updates the EndTime of the row storing the most recent collective feature status to be the current time, and (2) inserts a new row into database 200 with the new collective feature status and a StartTime set to the current time. That is, metering application 160 closes the metering interval associated with the most recent collective feature status by updating the EndTime of the corresponding row in table 200, and metering application 160 also inserts a row for a new metering interval with the new collective feature status and a StartTime set to the timestamp of the current time.

Stored feature statuses in table 200 (and in database 180 more generally) may be queried to generate licensing fee reports, reports on the usage of cloud computing service features, and the like. As described, reporter application 170 may automatically generate such reports (e.g., monthly), or on demand in response to user requests received via user interface 140 and intermediate application 150.

Figure 3:
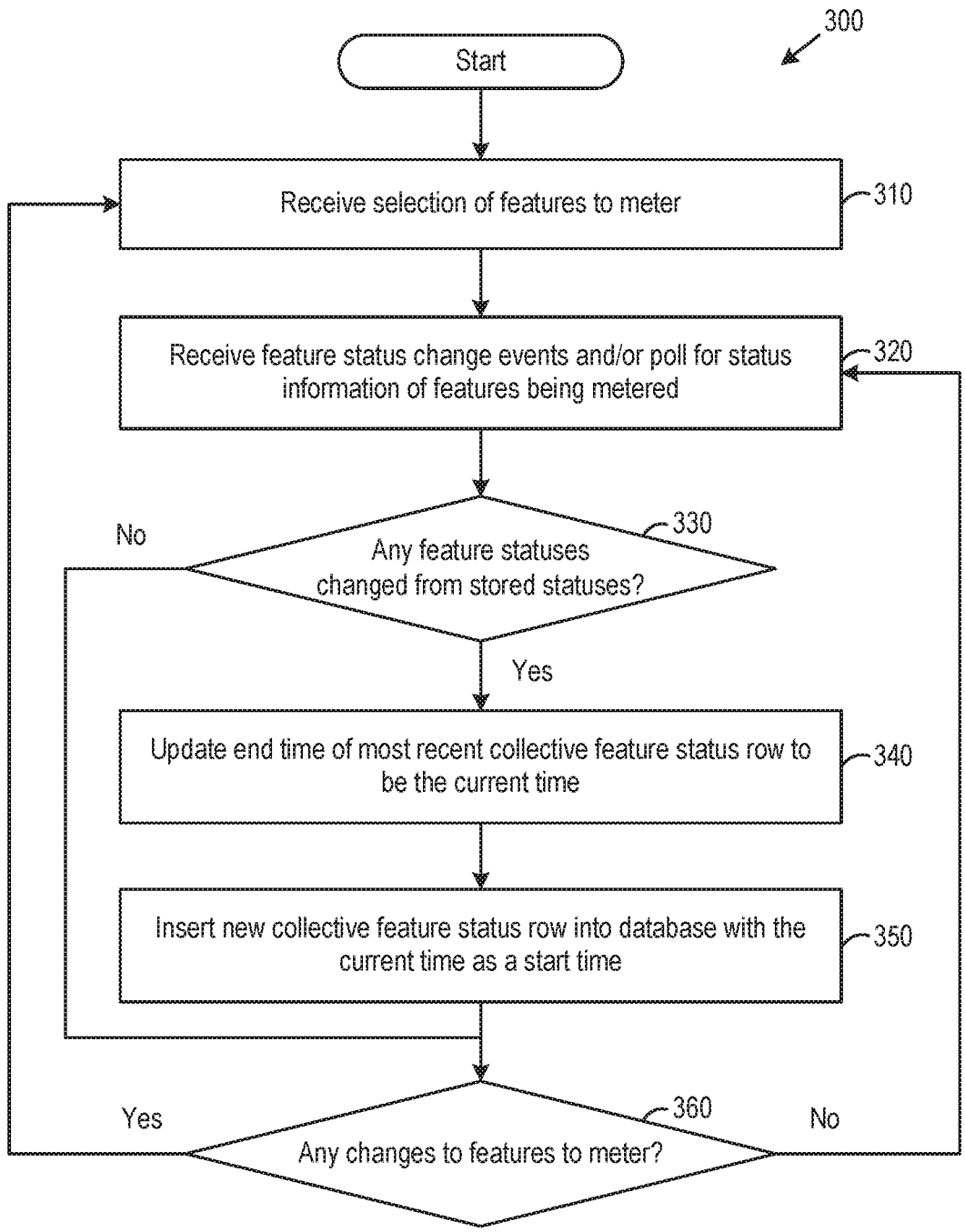
FIG. 3 is a flow diagram depicting a method of metering the usage of software features, according to an embodiment.

FIG. 3 is a flow diagram depicting a method 300 of metering the usage of software features, according to an embodiment. As shown, method 300 begins at step 310, where metering application 160 receives a selection of features to meter. The selected features will then be placed in a "watch list" and monitored, whether they are being used or not, until the features are unselected. As described, the selection of features to meter may include a user using a user interface such as user interface 140 to select a cloud computing service and the selected service being passed via intermediate application 120 to metering application 160, which then meters the features of that service as specified in a configuration file that an administrator may edit to add, modify, or remove features to meter for particular services. That is, the configuration file may be used to control the features metered by metering application 160, and the system administrator may edit the configuration file to add, modify, or remove such service features to meter. For example, the configuration file may be a file that is read when the metering application is started, and the configuration file may be updated and the metering application 160 restarted to change the feature set that is metered for a cloud computing service.

At step 320, metering application 160 receives feature status change events and/or polls for status information for the features being metered. As described, metering application 160 may be configured to receive events generated by API(s) 125 of management application 120 in response to feature status change events, proactively poll for feature status information on a periodic basis, or a combination of these. In one embodiment, the polling may include invoking one or more APIs that are provided by management application 120, such as health-checking APIs associated with health-checking component(s) used to monitor the statuses of cloud computing service(s) managed by management application 120 or APIs that can be invoked to check whether any VMs are complying with a policy that has the features defined, with the features being considered in use by any user of at least one VM compliant with the policy that has the features defined in it. In another embodiment, metering application 160 both receives feature status change events and performs polling. As described, the event-based process can be less resource intensive than polling, but periodic polling helps ensure that, even if any events are dropped, features statuses are still determined for at least the polling times. For example, events may be continuously generated whenever API(s) 125 detect that features are enabled or disabled, and metering application 160 may also poll for feature status information approximately every hour. As described, metering application 160 may consider features that are enabled as being in use, and vice versa.

At step 330, metering application 160 determines if the statuses of any selected cloud computing service's features have changed from the most recent stored statuses of those features. In one embodiment, metering application 160 queries database 180 to retrieve the status(es) of feature(s) being metered that are in a row not associated with an end time, which is indicative that the row stores the most recent collective feature status. Metering application 160 then compares the new feature status(es), determined from received events or through polling, with the feature status(es) retrieved from database 180 to determine whether the status of any feature being metered has changed.

If the statuses of any features being metered have changed from the most recent stored statuses of those features, then at step 340, metering application 160 updates an end time of a row in database 180 associated with the most recent collective feature status to be the current time. As described, each metering interval is persisted in database 180 as one row with Boolean columns for each feature, a start time marking the beginning of the interval, and an end time marking the end of the interval. Setting the end time to be the current time at step 340 closes the metering interval of the most recent collective feature status, as the collective feature status has changed. In addition, at step 350, metering application 160 inserts a new row into a database 180 table with the new collective feature status and the current time as its start time. That is, metering application 160 opens a new metering interval for the new collective feature status beginning with the current time at which the new collective feature status is identified.

In one embodiment, both cloud computing service(s) feature statuses and resource (memory and/or storage) usage are tracked. In such a case, if neither the resource usage nor the collective feature status has changed from the most recent status in database 180, then no operations to database 180 are required. Otherwise, any changes to either or both the collective feature status and the resource usage will result in closing of the current metering interval, with the ending of the interval being the current time, and creation of a new metering interval with its starting time being the current time.

If no statuses of features being metered have changed from the stored statuses of those features, or after metering application 160 inserts the new collective feature status entry at step 350, method 330 continues to step 360 where, if there are any changes to the features to meter, such as if another cloud computing service is selected for metering, method 300 returns to step 310, where metering application 160 determines the changed features to meter. If, on the other hand, there are no changes to the features to meter, then method 300 returns to step 320, where metering application 160 receives additional feature status change events and/or polls for status information of the features being metered.

Figure 4:
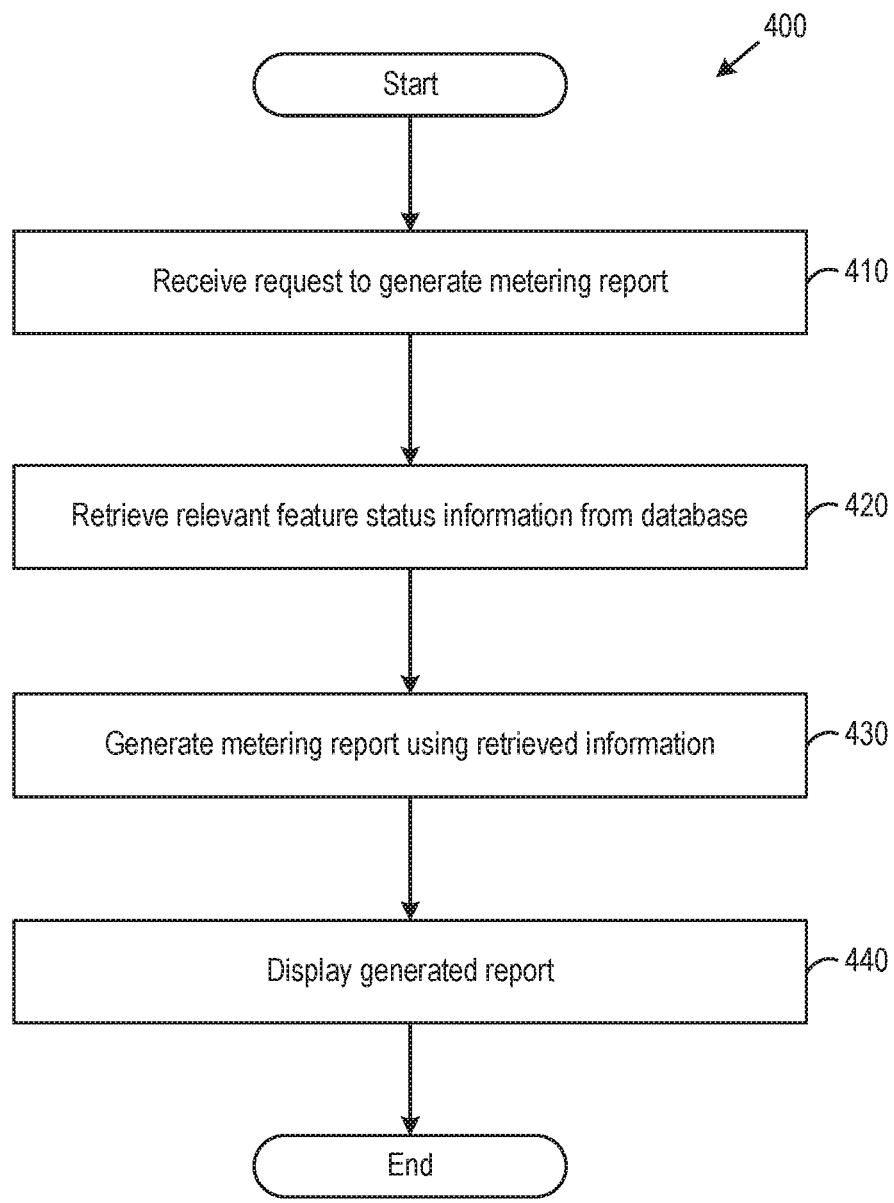
FIG. 4 is a flow diagram depicting a method of reporting the usage of features, according to an embodiment.

FIG. 4 is a flow diagram depicting a method 400 of reporting the usage of features, according to an embodiment. As shown, method 400 begins at step 410, where reporting application 170 receives a request to generate a usage report. As described, a user may interact with user interface 140 in one embodiment to request such a usage report, and inter-mediate application 150 may then pass the request to reporting application 170. In alternative embodiments, usage reports may be generated in other ways, such as automatically every month.

At step 420, reporting application 170 retrieves relevant feature status information from database 180. For example, reporting application 170 may query database 180 to retrieve feature status information for a particular cloud computing service during a time period (e.g., one month) specified in the request received at step 410. In such a case, for a given time period [PeriodStart, PeriodEnd], reporting application 170 may retrieve all rows corresponding to a service and user and having (EndTime>PeriodStart) and (StartTime<PeriodEnd). It should be understood that the retrieved rows correspond to metering intervals that are at least partially, but not necessarily fully, in the reporting period. In particular, metering intervals which start before the end of the period and end after the start of the period will be selected.

At step 430, reporting application 170 generates a usage report using the retrieved information. Any feasible usage report may be generated in response to the user request. For example, in the case of licensing, the generated report may include a cloud computing service's usage determined based on the following formula, in which the collective feature status during each interval is a multiplier that is multiplied with the length of the interval and resource usage in the interval:

$$\text{Usage} = \frac{\sum_{i=0}^{n}(R_i * T_i * U_i)}{\sum_{i=0}^{n} T_i},$$

where i are subscripts for the intervals ranging from 1 to n in the reporting period, $R_i$ is the resource in use (e.g., memory or storage in GB) in interval i, $T_i$ is the length of time in seconds for the ith interval in the reporting period, and $U_i$ is a usage rate determined in the ith interval. Different usage rates may be assigned to different combinations of features being enabled and disabled, and the rates may be specified in, e.g., a configuration file. For example, assuming there are four features F1, F2, F3, and F4, the usage rates may include:

$UR1 = \overline{F1}\ \&\&\ \overline{F2}\ \&\&\ \overline{F3}\ \&\&\ \overline{F4}$, which is a base rate when all four features are disabled, i.e., when the user is not using any of the features, $UR2 = F1\ \&\&\ \overline{F2}\ \&\&\ \overline{F3}\ \&\&\ \overline{F4}$, which is a rate for when only feature F1 is enabled and features F2, F3, and F4 are disabled, $UR3 = \overline{F1}\ \&\&\ F2\ \&\&\ \overline{F3}\ \&\&\ \overline{F4}$, which is a rate for when only feature F2 is enabled and features F1, F3, and F4 are disabled, and $UR4 = F1\ \&\&\ F2\ \&\&\ \overline{F3}\ \&\&\ \overline{F4}$, which is a rate for when features F1 and F2 are enabled but features F3 and F4 are disabled. In such a case, rate UR4 may be assigned a higher value than UR2 and UR3, as an additional feature is enabled, but UR4 may be set lower than the sum of UR2 and UR3 as a discount on the use of more features, i.e., UR4>UR2, and UR4>UR3, and UR4<UR2+UR3. In one embodiment, a usage rate for a given set of enabled features may also be determined as the lowest rate obtainable by adding rates to get to the enabled features. For example, the rate for when features F1 and F2 are enabled but features F3 and F4 are disabled may also be obtained by adding the rates UR2 and UR3, and reporting application 170 may pick the lower of UR4 and UR2+UR3. In another embodiment, usage rate levels may be defined such that usage of any features in a given level will result in a usage rate associated with that level (and if features in even higher levels are used, then a rate for the highest such level may be used). It should be understood that other licensing schemes may also be used with the feature status information retrieved from database 180.

Then at step 440, reporting application 170 causes the generated report to be displayed via, e.g., user interface 140. In one embodiment, reporting application 170 passes the report to web application 150 that provides a user interface (e.g., a webpage) including the report.

Figure 5:
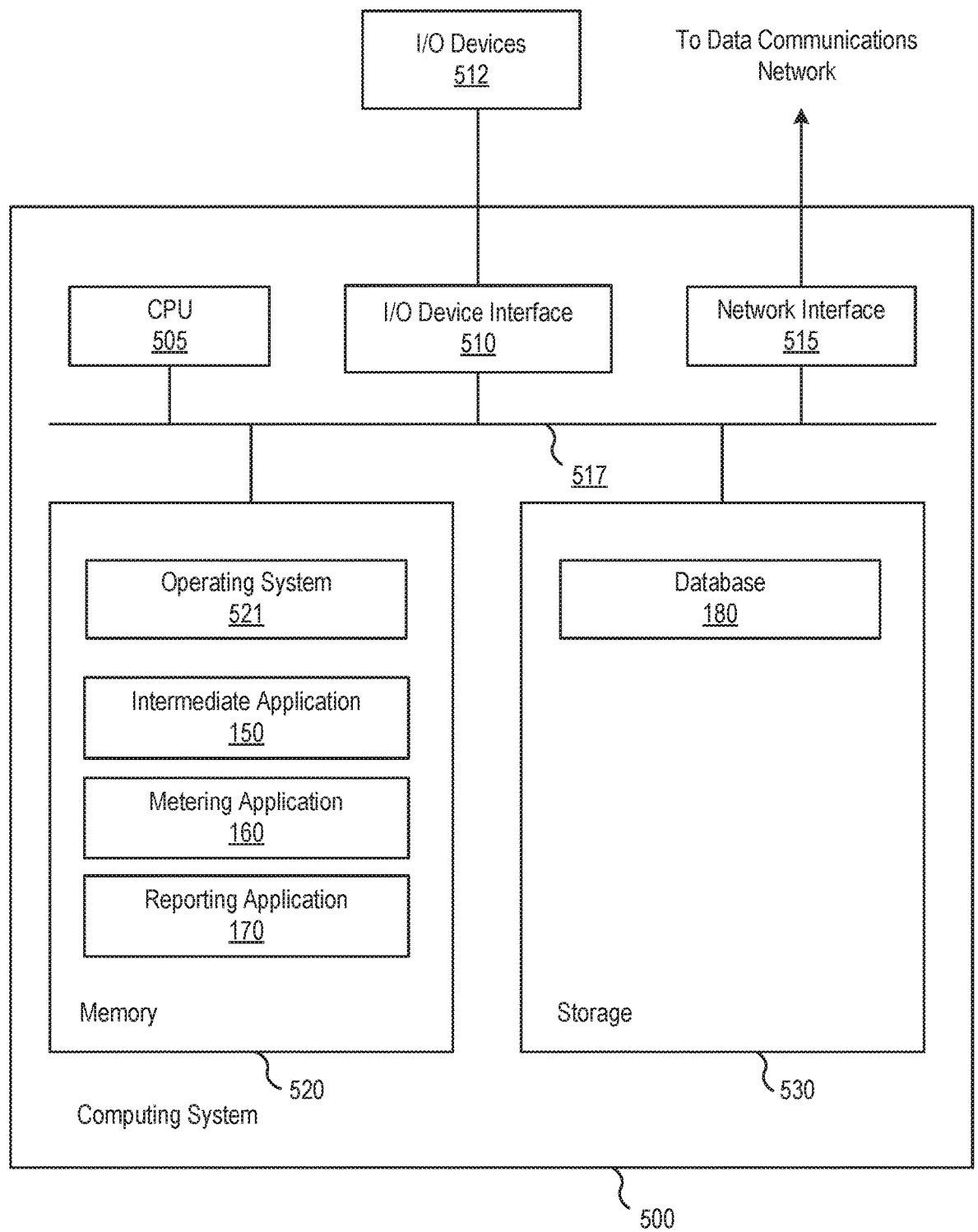
FIG. 5 depicts a block diagram of a system in which an embodiment may be implemented.

FIG. 5 depicts a block diagram of a system 500 in which an embodiment may be implemented. Although a physical system 500 is shown, it should be understood an alternative embodiment may be implemented as one or more virtual appliances running in host computer system(s). Virtual appliances are pre-configured VMs with software appliances installed therein.

As shown, system 500 includes, without limitation, a processor (e.g., such as a central processor unit or CPU, a microcontroller, application specific circuitry or the like) 505, a network interface 515, an interconnect 517, a memory 520, and storage 530. System 500 may also include an I/O device interface 510 connecting I/O devices 550 (e.g., keyboard, display and mouse devices) to system 500.

Processor 505 retrieves and executes instructions and data stored in memory 520. Interconnect 517 facilitates transmission, such as of instructions and data, between processor 505, I/O device interface 510, storage 530, network interface 515, and memory 520. Processor 505 may be implemented by a single CPU, multiple CPUs, a single CPU having multiple processing cores, and the like. Memory 520 may be implemented by a random access memory. Storage 530 may be implemented by disk drive storage device. Although shown as a single unit, storage 530 may combine fixed and/or removable storage devices, such as fixed disc drives, solid state drives (SSD), removable memory cards or optical storage, network attached storage (NAS), or a storage area-network (SAN). Further, although shown as a single computing system, one of ordinary skill in the art will be recognized that the components of system 500 may be distributed across multiple computing systems connected by a data communications network.

As shown, memory 520 includes an operating system 521 and intermediate application 150, metering application 160, and reporting application 170. Illustratively, operating system 521 may include Microsoft's Windows® or Linux®. Intermediate application 150 is configured to generate a user interface, through which input such as selections of cloud computing services to meter are received, and pass such input information to metering application 160, as well as to receive usage reports from reporting application 170 and display such reports via the user interface. Metering application 160 is configured to meter software usage at a feature level. In one embodiment, metering application 160 reads from a configuration file to obtain a selection of features to meter based on a user selection of a cloud computing service to meter; receives feature status change events and/or polls for status information for the features being metered; determines if the statuses of any features being metered have changed from the most recent stored statuses of those features; if the statuses of any features being metered have changed, updates an end time of a row in a database (e.g., database 180 maintained in storage 530) associated with the most recent collective feature status to be the current time and inserts a new row into the database with the new collective feature status and the current time as its start time; and determines new features to meter if there are any changes to the features to meter, according to method 300 described above with respect to FIG. 3. Reporting application 170 is configured to generate usage reports based on metered feature usage. In one embodiment, reporting application 170 receives a request to generate a usage report, retrieves relevant feature status information from a database (e.g., database 180), generates a usage report using the retrieved information, and causes the generated report to be displayed via a user interface, according to method 400 described above with respect to FIG. 4.

Although described herein primarily with respect to features of a cloud computing service, it should be understood that techniques disclosed herein may also be applied to other types of software that are not services provided over a network. That is, the features may include any regular software functional features not related to cloud computing, and the statuses of such features may be queried (e.g., from the software itself) even where the software is not running in a cloud. Although described herein primarily with respect to metered features of a cloud computing service being predefined in a configuration file, it should be understood that, in alternative embodiments, the user may be permitted to select individual features (or multiple such features) of a cloud computing service or other software to meter. Although described herein primarily with respect to tracking the enablement status of features, with enabled features being considered in use and vice versa, techniques disclosed herein may also be used to meter actual usage of features, as opposed to enabling or disabling features for use, where such actual usage can be determined.

Advantageously, techniques disclosed herein meter usage of software features, thereby providing insights into which features are being enabled or disabled for use (or actually used) by users. In one embodiment, both an event-driven process and a polling process are used to accurately determine feature usage while reducing the overhead that would otherwise be associated with polling too frequently. The determined feature usage information has various applications, including in licensing of software based on feature usage and in providing software developers feedback on feature usage. Feature-aware licensing differs from traditional licensing approaches by licensing the software at a finer level of granularity so that customers only pay for functionalities they actually use, as opposed to all features of the software or predefined license versions with certain features. For example, customers may subscribe to a license that permits use of all features, and then pay for only those features they (or their customers, in the case of cloud service providers obtaining a license and providing services to their customers) actually use. It should be understood that, unlike traditional licensing approaches, the customers do not need to switch licenses when their feature usage changes. The pricing of licenses can also be adjusted at the finer-grained feature level. Feature usage information may also aid software developers by providing statistics on feature usage that can be analyzed to determine which features the users actually need so that further development efforts can be focused on those features.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespace and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of dynamically probing user-configurable software having multiple features, each of which can be dynamically enabled or disabled, comprising:

periodically probing, by a metering application, an application programming interface (API) of a management application to determine a status change of features of one or more user-configurable software instances of a plurality of user-configurable software instances operating on one or more of a plurality of host computers of a cloud computing system, the management application configured to manage the plurality of host computers;

while periodically probing, listening, by the metering application, for events generated by the API, the generated events indicating the status change of features of the one or more user-configurable software instances; and for each of the features, determining, by the metering application, one or more durations during which the feature is enabled based on at least results of the probing and the generated events.

2. The method of claim 1, wherein:

the user-configurable software includes a service provided over a network;

and the periodic probing includes at least one of invoking a health-monitoring API provided by the management application to obtain enablement statuses of the features or invoking an API provided by the application which manages the service to check if any virtual computing instances are complying with one or more policies in which the features are defined.

3. The method of claim 2, wherein:
the service is one of a virtualized networking or a virtualized storage service; and
each of the plurality of user-configurable software instances operates on at least one virtual machine (VM) of one of the plurality of host computers.

4. The method of claim 2, wherein:
the management application provides a first user interface through which users can enable the features; and
the metering application provides a second user interface through which a cloud administrator can select which of the multiple features are to be probed and listened to by the metering application.

5. The method of claim 1, wherein:
determining the one or more durations during which each of the features is enabled includes comparing enablement statuses of the features determined through the periodic probing and the generated events with most recent stored enablement statuses of the features; and
if the enablement status of any feature determined through the periodic probing or the generated events has changed from the most recent stored enablement status of the feature, the changed enablement status of the feature is stored.

6. The method of claim 5, wherein:
the enablement statuses of the features are stored in rows in one or more database tables; and
each row in the one or more database tables stores a status of each of the features of the user-configurable software during a respective duration.

7. The method of claim 1, further comprising, generating a usage report based on at least the determined durations during which each of the features is enabled.

8. The method of claim 7, further comprising:
determining at least one of memory or storage usage during the determined durations during which each of the features is enabled,
wherein the report is generated to include a usage value determined by at least multiplying one or more rates determined based on at least enablement statuses of the features by the determined at least one of memory or storage usage.

9. The method of claim 8, wherein the rate at a given time is determined based on at least the features of the user-configurable software that are enabled at the given time.

10. A non-transitory computer-readable medium comprising instructions executable by a computer, the computer having one or more physical central processing units (CPUs), wherein the instructions, when executed, cause the computer to perform operations for dynamically probing user-configurable software having multiple features, each of which can be dynamically enabled or disabled, the operations comprising:
periodically probing, by a metering application, an application programming interface (API) of a management application to determine a status change features of one or more user-configurable software instances of a plurality of user-configurable software instances operating on one or more of a plurality of host computers of a cloud computing system, the management application configured to manage the plurality of host computers;
while periodically probing, listening, by the metering application, for events generated by the user-configurable software indicating features of the user-configurable software which are being enabled; and
for each of the features, determining, by the metering application, one or more durations during which the feature is enabled based on at least results of the probing and the generated events.

11. The computer-readable medium of claim 10, wherein:
the user-configurable software includes a service provided over a network;
the periodic probing includes at least one of invoking a health-monitoring API provided by the management application to obtain enablement statuses of the features or invoking an API provided by the management application to check if any virtual computing instances are complying with one or more policies in which the features are defined.

12. The computer-readable medium of claim 11, wherein:
the service is one of a virtualized networking or a virtualized storage service; and
each of the plurality of user-configurable software instances operates on at least one virtual machine (VM) of one of the plurality of host computers.

13. The computer-readable medium of claim 11, wherein:
the management application provides a user interface through which users can enable the features; and
the metering application provides a second user interface through which a cloud administrator can select which of the multiple features are to be probed and listened to by the metering application.

14. The computer-readable medium of claim 10, wherein:
determining the one or more durations during which each of the features is enabled includes comparing enablement statuses of the features determined through the periodic probing and the generated events with most recent stored enablement statuses of the features; and
if the enablement status of any feature determined through the periodic probing or the generated events has changed from the most recent stored enablement status of the feature, the changed enablement status of the feature is stored.

15. The computer-readable medium of claim 14, wherein:
the enablement statuses of the features are stored in rows in one or more database tables; and
each row in the one or more database tables stores a status of each of the features of the user-configurable software during a respective duration.

16. The computer-readable medium of claim 10, the operations further comprising, generating a usage report based on at least the determined durations during which each of the features is enabled.

17. The computer-readable medium of claim 16, the operations further comprising:
determining at least one of memory or storage usage during the determined durations during which each of the features is enabled,
wherein the report is generated to include a usage value determined by at least multiplying one or more rates determined based on at least enablement statuses of the features by the determined at least one of memory or storage usage.

18. The computer-readable medium of claim 17, wherein the rate at a given time is determined based on at least the features of the user-configurable software that are enabled at the given time.

19. A system, comprising:
a processor; and
a memory, wherein the memory includes a program for dynamically probing user-configurable software having multiple features, each of which can be dynamically enabled or disabled, the program being configured to perform operations comprising:

periodically probing, by a metering application, an application programming interface (API) of a management application to determine a status change features of one or more user-configurable software instances of a plurality of user-configurable software instances operating on one or more of a plurality of host computers of a cloud computing system, the management application configured to manage the plurality of host computers;

while periodically probing, listening, by the metering application, for events generated by the API, the generated events indicating the status change of features of the one or more user-configurable software instances; and for each of the features, determining, by the metering application, one or more durations during which the feature is enabled based on at least results of the probing and the generated events.

20. The system of claim 19, wherein:

the user-configurable software includes a service provided over a network;

and the periodic probing includes at least one of invoking a health-monitoring API provided by the management application to obtain enablement statuses of the features or invoking an API provided by the application which manages the service to check if any virtual computing instances are complying with one or more policies in which the features are defined.

* * * * *